United States Patent [19]

Gross

[11] Patent Number: 4,725,061

[45] Date of Patent: Feb. 16, 1988

[54] CHILDREN'S CLOCK

[75] Inventor: Hagen Gross, Bad Homburg, Fed. Rep. of Germany

[73] Assignee: Diehl GmbH & Co., Nuremberg, Fed. Rep. of Germany

[21] Appl. No.: 897,808

[22] Filed: Aug. 19, 1986

[30] Foreign Application Priority Data

Sep. 19, 1985 [DE] Fed. Rep. of Germany ... 8526776[U]

[51] Int. Cl.$^4$ .......................... A63F 9/10; G09B 19/12

[52] U.S. Cl. ................................ 273/157 R; 368/327; 434/304

[58] Field of Search .................... 273/157 R; 368/232, 368/238, 327; 434/304

[56] References Cited

U.S. PATENT DOCUMENTS 3,608,906 9/1971 Odier .............................. 273/157 R 4,368,046 1/1983 Bernick ............................... 434/304

FOREIGN PATENT DOCUMENTS 2352021 10/1975 Fed. Rep. of Germany .

100493 8/1923 Switzerland .................... 273/157 R

*Primary Examiner*—Anton O. Oechsle

*Attorney, Agent, or Firm*—Scully, Scott, Murphy and Presser

[57] ABSTRACT

A children's clock including a dial face area containing exchangeable pictorial or design elements. The dial face area of the children's clock is configured as a changeable puzzle picture. The puzzle picture motif can be correlated with the age of the child; in effect, can in a so-called manner grow along with the child, as a consequence of which there is achieved that the child, during every stage of development, will gladly playingly occupy himself with this puzzle clock and thereby, during the course of completing the picture motif, is occupied with the time display and at least with the hour-hand, and in constant repetition with the concept of time or recognition of the time cycle. Hereby, there can be provided different time display arrangements for the different learning stages, which in the shape of exchangeable time displays can, in addition to the puzzle parts, be detachably fastened in the plane of the dial face area.

7 Claims, 2 Drawing Figures

CHILDREN'S CLOCK

BACKGROUND OF THE INVENTION

1. Field of the Invention

The present invention relates to a children's clock including a dial face area containing exchangeable pictorial or design elements.

2. Discussion of the Prior Art

A children's clock of the species under consideration herein has become known from the disclosure of German Laid-Open patent application No. 23 52 021. In that particular instance, exchangeable symbols are provided as the hour markings of the time display; whereby these exchangeable symbols are provided on the outer surfaces of cubes so as to in correlations with the stage of development of the child, to be able to represent initially certain points in time in an index mode and, later on, also in the form of numerals.

SUMMARY OF THE INVENTION

Accordingly, it is an object of the present invention to provide a children's clock of this general type which may be adapted to constitute a teaching medium, but that it does not become a juvenile furnishing object of a child's room, inasmuch as such a children's clock would become uninteresting to the child when the learning process has been broken off or has been completed. In addition thereto, clocks whose dial faces are decorated with juvenile motifs or illustrations rapidly lose the interest of a child, and thereafter do not provide any time or clock function for the child, but merely the function of an ordinary picture for a child's room. However, the child should always again occupy himself with the clock in order to be able to finally intuitively comprehend time cycles and points in time.

SUMMARY OF THE INVENTION

Accordingly, in recognition of these conditions, it is an object of the present invention to so enhance this intended purpose in the utilization of a children's clock, that the child will not only fleetingly but over lengthier time opens again always uncover a further interest in occupying himself or herself with the clock.

The foregoing is inventively achieved in a children's clock of the type under consideration, in which the dial face area is constituted of as a picture puzzle.

The inventive concept in formulating the spatial shape is thus predicated on configuring the dial face area of the children's clock as a changeable puzzle picture. The puzzle picture motif can be correlated with the age of the child; in effect, can in a so-called manner grow along with the child, as a consequence of which there is achieved that the child, during every stage of development, will gladly playingly occupy himself with this puzzle clock and thereby, during the course of completing the picture motif, is occupied with the time display and at least with the hour-hand, and in constant repetition with the concept of time or recognition of the time cycle. Hereby, there can be provided different time display arrangements for the different learning stages, which in the shape of exchangeable time displays can, in addition to the puzzle parts, be detachably fastened in the plane of the dial face area. The interest in the clock can additionally be maintained alert in that different picture motifs which are combined from the puzzle, require a different orientation of the clockwork mechanism; in essence, of the time display in the picture surface.

Thus, pursuant to the invention there is created a relatively inexpensively produceable multi-faceted children's clock constituted of plastic components safely handable by a child, in which interest will remain alert over years through the motif with the therewith growing or maturing puzzle pictures; with the result, that this children's clock will not readily merely become a picture-like wall decorating element, or even an infant's toy which is stored away in a corner, but in addition to the function of a time display in the puzzle picture assembly, will provide for the playing occupation by the child over a broad age span.

BRIEF DESCRIPTION OF THE DRAWINGS

Additional alternatives and modifications, as well as further features and advantages of the invention can now be ascertained from the following detailed description thereof, taken in conjunction with the accompanying generally schematic drawings; in which.

DETAILED DESCRIPTION

Figure 1:
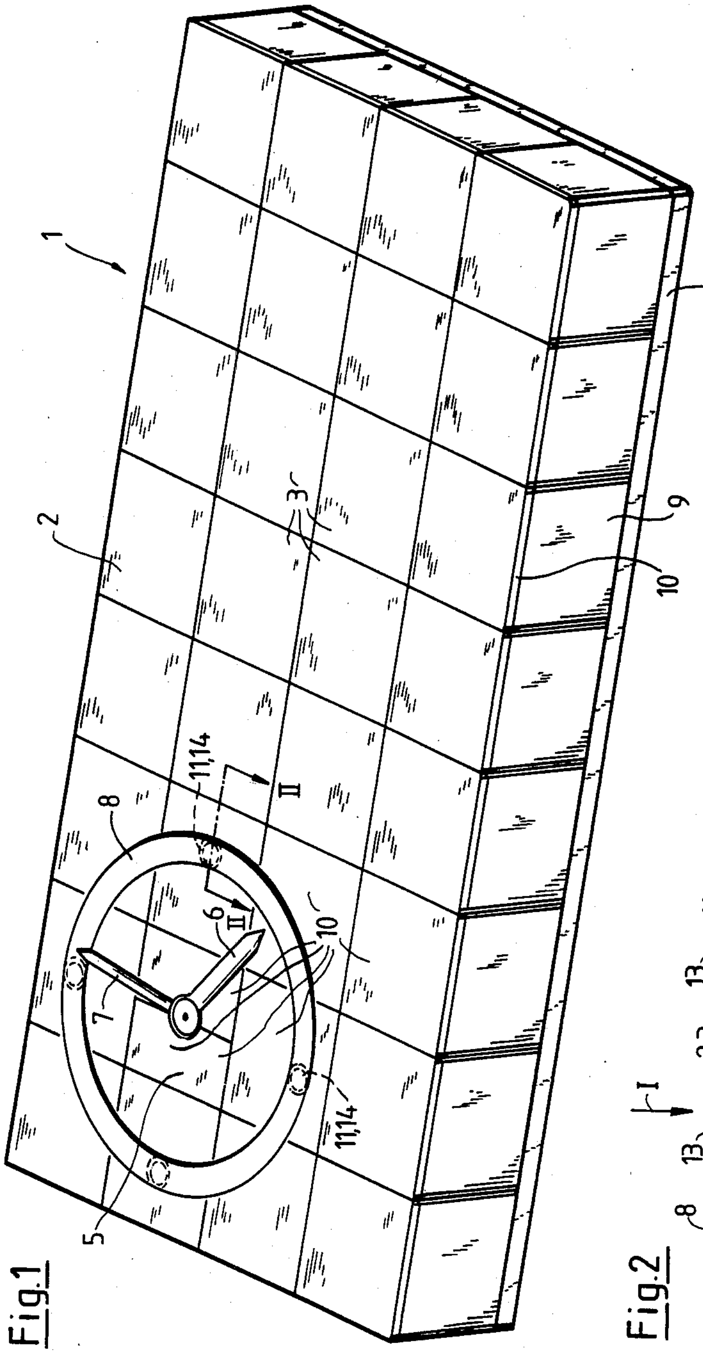
FIG. 1 illustrates a perspective front and top view of a children's clock in the shape of a puzzle carrier with an eccentrically arranged, exchangeable time display.

The illustrated childrens clock 1, on its upper surface, generally in the plane of the here so-called dial face area 2, is provided with exchangeable pictorial design or decorative elements, which represent the dial face area 2 as a picture puzzle 3. The individual parts of this puzzle 3 which, when correctly assembled in a neighboring sequence produce a closed or complete pictorial illustration, are form-fittedly exchangeably fastened on a base support 4, which also receives the electromechanical clockwork mechanism 5 for the time-maintaining movement of at least one hour-hand 6 (and when provided, also a minute-hand 7) along the scale rim of a time display 8.

The clockwork mechanism 5 can be fixedly connected with the base support 4; for instance, it can be clamped or screwed into a recess of a molded member forming the base support 4. However, the base support 4 is preferably so configured that the clockwork mechanism 5 is detachably fastened thereon, and can be located in different positions, in order to locally coordinate the positioning of the time display 8 with different pictorial illustrations of the puzzle 3. The square-shaped clockwork mechanism can then be inserted into hollow spaces provided in different positions in the support base support 4, whereas the hollow spaces which are momentarily not covered by the clockwork mechanism 5 are closed, for example, by basic or foundation members 9, such that there is obtained a flat surface for the dial face area 2. The picture puzzle 3 can then consist of a number of uniformly-shaped or profile-edged thin, possibly flexible, but in all instances, mechanically stable plates 10 with imprinting thereon of the applicable part of the picture, which are fastenable to the basic members 9, in accordance with the illustrated example, in a form-fitted and thereby exchangeably on the base support plate 4. At a suitable arrangement of the individual plates 10 adjoining each other, from this puzzle 3 there is obtained the entire desired picture on the dial face area 2.

The segmented pictorial illustration of the puzzle 3 can, however, be also directly provided on the square-shaped or, preferably, even cube-shaped basic foundation members 9, such that there are obtained different pictures when different side surfaces of the basic members 9 have their side surface face upwardly adjoining each other. The basic members 9 of such a cube puzzle 3 can be retained within a clamping frame which is formed on the base support or bottom plate 4 or (not shown in the drawing) can be inserted in a form-fitted manner into the hollow spaces in the base support 4 in order to achieve a mechanically stable grouping of the picture in the dial face area 2 in conjunction with the clockwork mechanism 5 and the time display 8. However, when the clockwork mechanism 5 is equipped with a sufficient magnetic cladding, it would be more expedient that the basic members 9 of the cube puzzle be provided with a ferromagnetic material and arranged on a base support 4 which is equipped with permanent magnets, generally in the form of a so-called magnetic foil (plastic foil with magnetic powder smelted therein).

However, there is obtained an impression of a complete picture when the parts of the puzzle 3 along the sides of their edges are not bound to the plan geometry of the basic members 9, but in their exchangeable interengagement can project sideways beyond this geometry, which can be realized when the picture of the puzzle 3 is assembled from individual plates 10.

For obtaining different pictorial illustrations on the dial face area 2, the basic members 9 need no longer be removed and turned in order to be again inserted with a different upwardly facing surface; but the plates 10 are close fittingly detachably positioned on to the surface of the basic members 9; in essence, in regions in which there is not intended any exchange of a basic member 9 with respect to the clockwork mechanism 5, directly on the applicable upwardly protruding surface of the base support 4; for example, by means of elastically compressible projecting heads or knobs 11 which are pressed into clamping apertures 12. In the illustrative embodiment pursuant to FIG. 2, the knobs 11 are formed on the bottom side of the plate 10 and the apertures 12 in the upper surface 13 of the basic foundation members 9 or, respectively, in the base support plate 4'.

Figure 2:
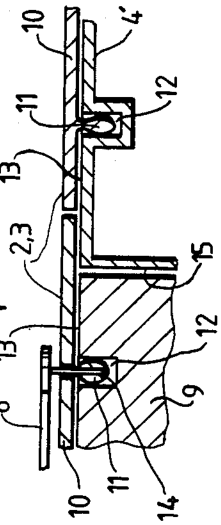
FIG. 2 illustrates a fragmentary sectional view, taken along line II—II in FIG. 1, of the fastening of the puzzle plates and the time display on a base support member.

In FIG. 2 further consideration is given to that certain of the puzzle plates 10; in effect, also the areas of the base support plate 4 or the basic members 9 which are provided with the clamping apertures 12, are concurrently adapted to fasten separately the circular or ring-shaped time display 8 (which can also be divided into individual sectors or arcuate pieces) in generally the plane of the dial face area 2. For this purpose, in the illustrated embodiment, the time display 8 is provided with socket pins 14 which can be close-fittedly introduced into bores which extend through the plates 10 into their knobs 11.

When a child, for whom this children's clock 1 is simultaneously a decorative toy and a learning aid for understanding the time cycle and the hour divisions of a day, receives as a present a new set of puzzle plates 10, th child must thereafter remove the hands 6, 7 and the time display 8, as well as the plates 10 of the previous pictorial illustration of the dial face area 2, pursuant to the future position of the clockwork mechanism 5 exchange this with respect to the basic member 9 still located therein, group the plates 10 with the correctly assembled motif or design in the plane of the dial face area 2; in effect on the support plate 4', the base members 9 and the clockwork 5, and fix at the applicable location through pressing in of the knobs into the apertures 12 located therebelow whereupon the time display 8 (or another time display) as well as the hands 6, 7 which are produced of unbreakable material, can be again attached thereon.

Expediently, not only are there made available puzzle plates 10 with a picture whose motif is correlated with the stage of development of the child, but also different time displays 8. Thus, inventively, the scale of a time display 8 for the initial learning phase of a small child is merely constituted of legible hour markings; for example, in the shape of differently colored points, with whom there is associated merely the hour-hand 6. In an advanced learning phase, a time display 8 is made available to the child, in which the hour markings are graphically set back, and the hour numerals dominate which are associated therewith. When the child has understood the concept of the time cycle in its hourly association, the clock 1 can then be additionally equipped with the minute-hand 6; whose movement has associated therewith on the time display 8 minute markings, and as occasioned, additional numerical minute time displays; for instance, of the same color as the coloring of the minute-hand 7 (differing from that of the hour-hand 6). Thus, not only can the motif or the illustration of the picture puzzle 3 of the children's clock 1 grow along with the development of the child, but also the time representation which is interconnected with that in the motif can be conformed to the development process of the child, such that there is obtained a children's clock which will, over the course of many years, not lose its attractiveness to a child.

What is claimed is:

1. A children's clock including a dial face area comprising a picture puzzle with exchangeable design or decor elements, which provide for exchangeable and different pictorial designs or motifs on the dial face area; wherein the parts of the puzzle are detachably fastened in a close-fitting arrangement on a base support; and a clockwork mechanism arranged on said base support and being detachably fastenable to different locations on the base support.

2. A children's clock as claimed in claim 1, wherein the puzzle is constituted of a plurality of individual plates, said plates being fastenable on the base support or on basic foundations members which are removably fastened on the base support.

3. A children's clock as claimed in claim 2, wherein the puzzle plates include edge regions deviating from the edge configuration of the basic foundation members located therebelow.

4. A children's clock as claimed in claim 2, wherein the puzzle plates or the basic members are magnetically retained on a bottom support plate.

5. A children's clock as claimed in claim 2, wherein the plates are close-fittingly postionable through clamping projecting heads engaging into clamping apertures in the upper surface of the basic foundation members or a bottom support plate.

6. A children's clock as claimed in claim 1, including a time display which is detachably fastenable in its entirety or in arcuate sections or segmented pieces in close-fitting relationship on the dial face area.

7. A children's clock as claimed in claim 6, wherein exchangeable time displays are provided with different time scales.

* * * * *